US006994329B2

United States Patent
Kronawitter

(10) Patent No.: US 6,994,329 B2
(45) Date of Patent: Feb. 7, 2006

(54) FLOATING PADDLEWHEEL AERATOR

(76) Inventor: Andreas Kronawitter, Industriegelaende 1, 94522 Wallersdorf (DE)

( * ) Notice: Subject to any disclaimer, the term of this patent is extended or adjusted under 35 U.S.C. 154(b) by 7 days.

(21) Appl. No.: 10/472,980

(22) PCT Filed: Apr. 2, 2002

(86) PCT No.: PCT/EP02/03637

§ 371 (c)(1),
(2), (4) Date: Jan. 21, 2004

(87) PCT Pub. No.: WO02/078825

PCT Pub. Date: Oct. 10, 2002

(65) Prior Publication Data

US 2004/0130044 A1    Jul. 8, 2004

(30) Foreign Application Priority Data

Mar. 30, 2001  (DE) ............................ 201 05 706 U

(51) Int. Cl.
*B01F 3/04*    (2006.01)

(52) U.S. Cl. ....................... 261/92; 261/120; 210/242.2

(58) Field of Classification Search ................ 261/92, 261/120, DIG. 70, DIG. 71; 210/242.2
See application file for complete search history.

(56) References Cited

U.S. PATENT DOCUMENTS

| 3,595,538 | A | * | 7/1971 | Baumann | ..................... 261/92 |
|---|---|---|---|---|---|
| 3,675,779 | A | * | 7/1972 | Grutsch et al. | .......... 210/242.2 |
| 3,719,353 | A | * | 3/1973 | Cherne et al. | ................ 261/90 |
| 3,823,922 | A | * | 7/1974 | McElreath | .................... 261/92 |
| 4,409,107 | A | * | 10/1983 | Busch | ......................... 210/758 |
| 4,741,825 | A | * | 5/1988 | Schiller | ....................... 210/170 |
| 5,104,589 | A | * | 4/1992 | Palmer et al. | ............... 261/120 |
| 5,160,459 | A | * | 11/1992 | Guarnaschelli et al. | ........ 261/92 |
| 5,595,691 | A | * | 1/1997 | Hsu | ............................. 261/120 |
| 5,744,072 | A | * | 4/1998 | Karliner | ....................... 261/87 |
| 2002/0190401 | A1 | * | 12/2002 | Sylvester | ...................... 261/92 |
| 2003/0030157 | A1 | * | 2/2003 | Petrescu et al. | .............. 261/92 |

* cited by examiner

Primary Examiner—Scott Bushey

(74) Attorney, Agent, or Firm—Peter E. Rosden

(57) ABSTRACT

The invention relates to a floating paddlewheel aerator for aerating water or clearing basins. The paddlewheel aerator includes a frame (1) of elongated floats (2, 3), which are substantially arranged at a right angle to each other and are linked with each other in a T or H configuration. On a first float (2), further floats (3) or sections of floats are mounted on both of the first float's opposite ends. The first float (2) has a top which is turned upwards by 90° compared to its lateral sides on which further floats/float sections (3) are mounted and carries a drive unit (9). This drive unit (9) is mounted completely or partially on the floats, and its output shaft (10) projects outwardly from both sides parallel to the longitudinal extension of the further floats/float sections (3). Paddles (22) are disposed on the output shaft (10) and in the operational state of the aerator, when the floats float on the surface of the water or clearing basin, the shaft rotates above the level of the water or clearing basin, and sections of the co-rotating paddles are immersed in the liquid.

14 Claims, 8 Drawing Sheets

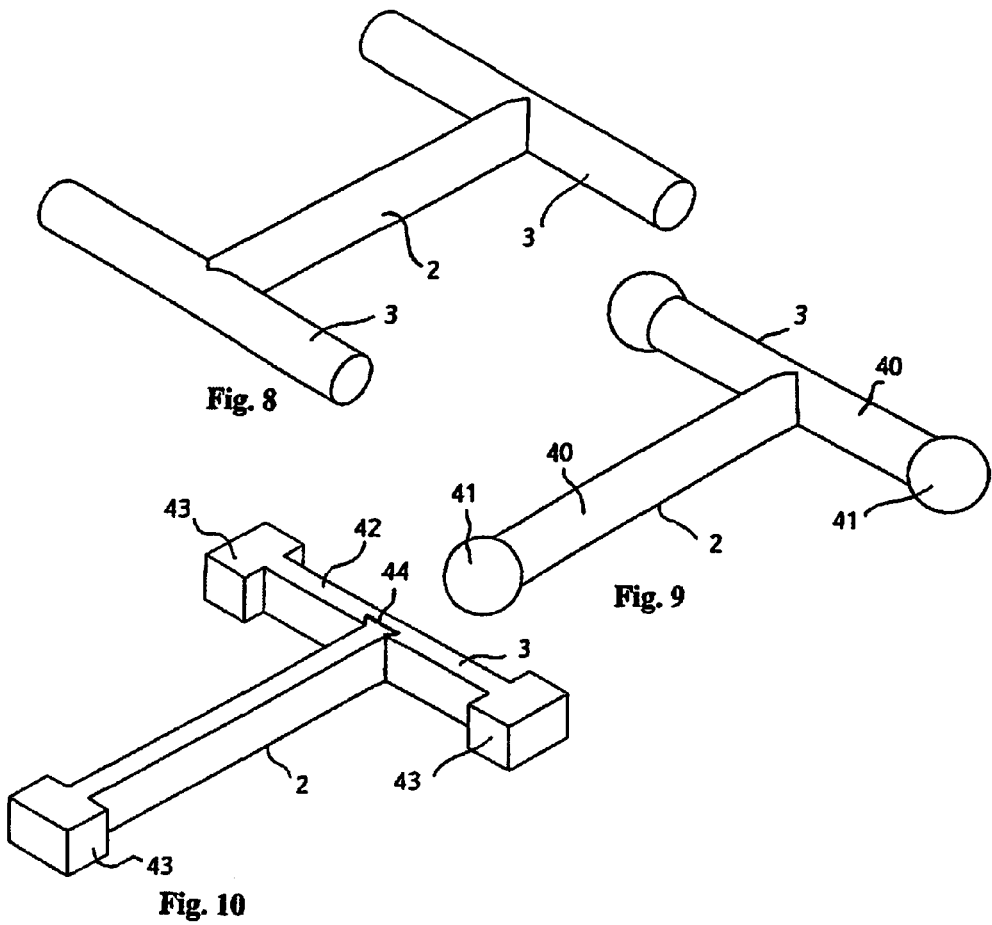
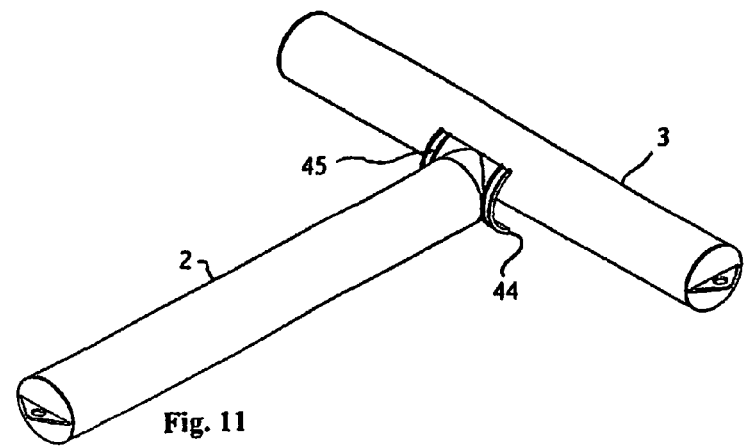

FLOATING PADDLEWHEEL AERATOR

The invention relates to a floating paddlewheel aerator for aerating water and clearing basins. The floating paddlewheel aerator comprises a frame with elongated floats, at least one drive unit with an output shaft, which drive unit is supported by the frame, and paddles mounted on this shaft which during operation hit the water, of which components in the operational state of the aerator the floats float on the surface of the water or clearing basin surface, the shaft rotates above the level of the water or clearing basin and parts of the paddles rotating with the shaft are immersed into the liquid.

The paddlewheel aerators serve for stirring the water surface, e.g. in sea fish, crab and mussel farms or other water cultures, but also in clearing basins, with the help of the paddles which hit the water. The aerator either floats to and fro along the surface of the body of water to be aerated according to an itinerary or is anchored stationary at a certain location.

Known models of such paddlewheel aerators exhibit three parallel floats which are bridged by a frame. The floats can be tube-shaped floating bodies, but also, for example, bars with floating bodies attached to them at the ends or at a distance from each other. Above the central float the frame carries a drive unit, in most cases an electric motor with a transmission, which in known paddlewheel aerators is a worm gearing and substantially lowers the rpm. From this transmission shafts on both sides run towards the marginal floats which carry the paddlewheels in the form of parallel star-shaped rings in radial planes. In order to make possible certain relative mutual movements of the floats themselves, the shafts on both sides, which are each supported at the marginal float by means of a hydrostatic bearing, are connected to output shafts of the transmission housing via universal joints or Hardy discs.

These known paddlewheel aerators have a relatively complex structure and due to the short service life of some of their components are relatively short-lived themselves. In particular, the transmission in the transmission housing and the shaft supports including the hydrostatic bearings, which are plastic bearings with water sliding surfaces, have a short service life. Especially with the motor and the transmission the function is impaired by incoming water, in particular sea water, which remains in the housing. Both via the bearing and the air vents which are to make possible a breathing of the housing interiors, particles of the stirred water penetrate into the housing and lead to quicker corrosion. The worm gearing inherently has a relatively short service life due to increased friction of the moving parts and a lower efficiency than other drives such as spur gears, e.g.

By means of the invention these disadvantages are to be avoided and in particular the construction is to be made simpler and more stable so that the service life of the machine is also increased. This is achieved by the inventive measures. The inventive floating paddlewheel aerator is characterized in that the floats form the frame, are substantially arranged at a right angle and are linked to each other rigidly in a configuration where at the two opposite longitudinal sides of a first float further floats or sections of floats are attached. Furthermore, it is characterized in that this first float on its top, that is turned upwards by 90° compared to its lateral sides on which the further floats/float sections are mounted, completely or partially carries the drive unit. The output shaft of the drive unit projects on both sides and parallel to the longitudinal extension of the further floats/float sections and is the paddles-carrying shaft. Preferably, the drive unit is mounted in a housing from which the output shaft projects on both sides as a shaft section supported at one end only.

By means of these measures a robust, simply constructed floating paddlewheel aerator is created whose construction is in particular, however not exclusively, suitable for small paddlewheel aerators with only two paddlewheels. The bearings of the paddlewheel shafts do not pose any problems since each shaft is supported in only one area, i.e. in the drive unit assembly, and their ends are not supported so that certain water movements and frame torsion resulting therefrom, which are anyway almost non-existent with the defined frame construction, do not lead to increased load on the bearings nor increased wear. In the simplest case the configuration of the floats is a T configuration, an alternative being a H configuration or also a cross configuration.

In order to facilitate the transport from the production site to the operation site the floats are preferably connected to each other to be mounted at the site in such a way that the individual components can be transported without having been assembled. In a particular embodiment they are even identical so that there is no difference between the longitudinal floats and the transverse floats and production as well as stock keeping are simplified. For connecting the floats with each other there are several possibilities known to the person skilled in the art, e.g. welded joints, thread connections, dovetail connections, connections with T flanges and clamps or with counter shells.

According to the invention, the drive unit, usually consisting of an electric motor with transmission, however also a stepper motor, low-speed motor or a internal combustion engine with transmission can be used, is arranged in a housing which is mounted on the float and is rigily connected to it and from which the shaft projects on both sides as a shaft supported by one end whose free end is not supported in a bearing. Thus, there are no problems resulting from frame torsion in the case of a rough water surface. Within the scope of the invention the parts of the drive unit can also be distributed to several floats. A particularly suitable and low-maintenance transmission is a belt drive where only the belt has to be changed at regular intervals. Further possibilities include gears, spur gears, worm gears, friction discs or chain drives.

A preferred attachment of the paddles to shaft end portions which is made possible by supporting the shaft by one end only is that the paddles are attached to a support plate which is mounted on the shaft ends and which is stuck onto a non-circular, e.g. hexagonal coupling part at the shaft end where it is secured against a longitudinal movement, wherein preferably the non-circular coupling part is a nut which is screwed onto a threaded bolt screwed into a thread bore in the shaft end, a further nut being screwed onto it for securing the support plate, and the threaded bores, threaded bolts and nuts on the opposite shaft end portions having opposite thread orientations, which are chosen in the sense of a driving in by the rotation resistance against the driving direction. These measures make it possible that the paddle support plates can be assembled and disassembled at site and are stably mounted in operation. They are mounted with the help of simple standard components and without special experience or aptitude being necessary.

Further details, advantages and developments of the invention can be taken from the below description of preferred embodiments where reference is made to the drawings in which FIG. 1 is a perspective view of an inventive paddlewheel aerator wherein for the sake of clearness a front paddlewheel has been omitted;

FIGS. 8, 9, 10 and 11 are perspective views of variations of the float;

Figure 1:
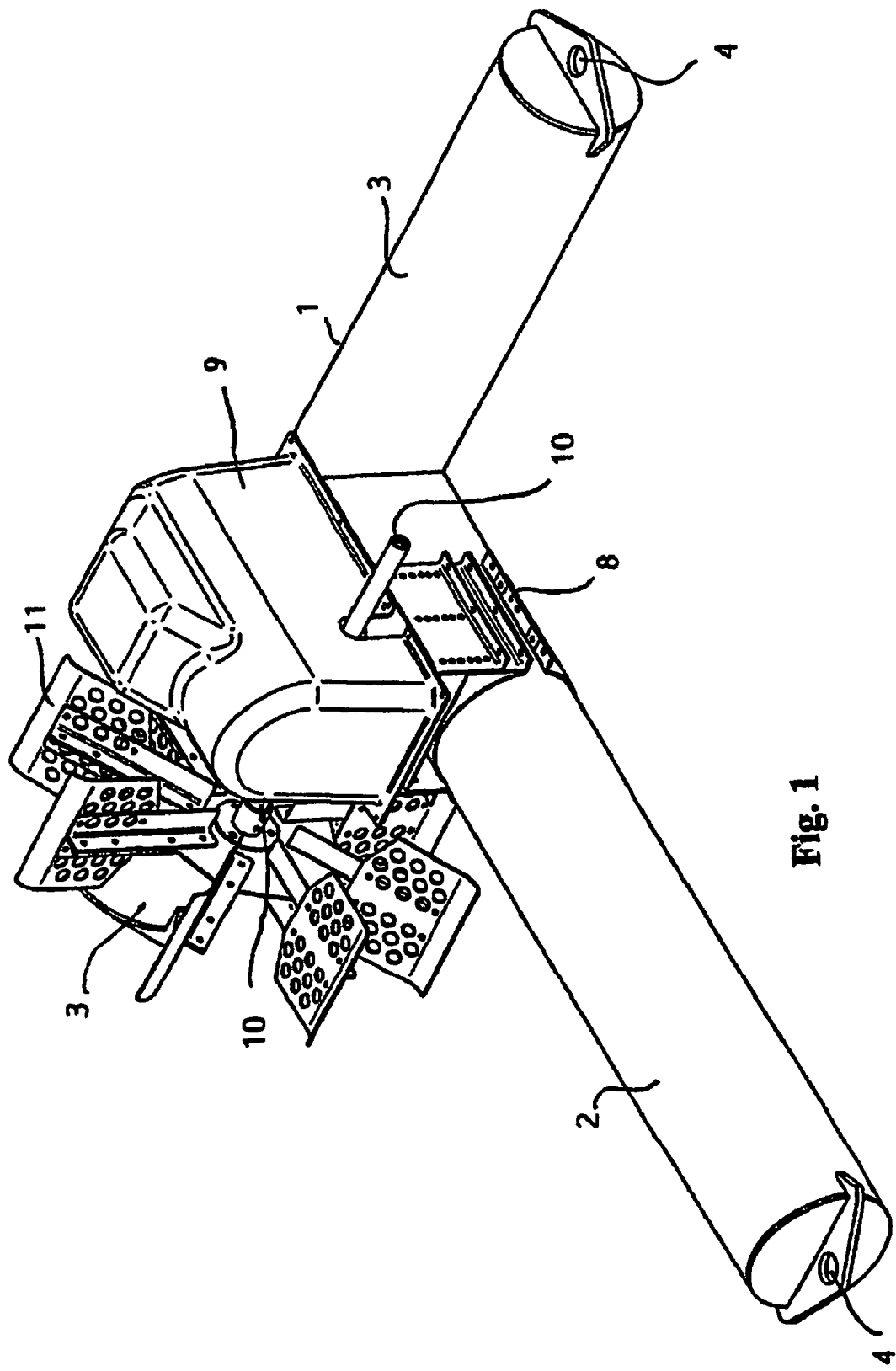

A paddlewheel aerator according to FIG. 1 exhibits a frame 1 which consists of two elongated, tube-shape floats 2 and 3 which are rigidly connected to each other in a right-angled T configuration. The floats consist of closed air-filled tubes, for example made of a plastic material, and at their ends they exhibit eyes 4 with whose help they can be put on a lead and drawn over the water or joined together with others for operation in parallel. Their cross-section can be chosen according to other practical reasons, in FIG. 1 it is represented to be circular, however, it can also be rectangular (FIG. 10).

In the construction shown a drive unit assembly 9 on the float 2 which runs in longitudinal direction with respect to the T configuration, is mounted with the help of pipe clamps 8. In this drive unit assembly 9 an electric motor with transmission is located (not shown in the figures) and from which a cable which is not shown in the figures runs towards an on-shore power source. From the housing of the drive unit assembly 9 on both sides a shaft end portion 10 projects whose axis is parallel to the longitudinal axis of the transverse elongated float 3 and thus crosses the corresponding axis of the longitudinal elongated float 2 at a right angle. The shaft end portions 10 which form a continuous shaft and are linked with the end gear wheel of the transmission of the drive unit assembly 9 each carry a paddlewheel 11 wherein in FIG. 1 only the rear paddlewheel is shown in its assembled state. The drive unit assembly 9 and the paddlewheels 11 are thus both carried and held in place by the pipe clamps 8. The shaft end portions 10 are located at such a height over the water surface that the lower part of the paddles of the paddlewheels 11 is immersed into the water when they are rotating. The water is stirred and thus aerated.

Although a possible wave motion of the water makes the frame 1 make an overall skipping motion, it does not lead to increased torsion nor to an increased load on the shaft bearings. The force acting on the shaft end portions is substantially the resistance of the water which counteracts the rotation of the paddlewheels 11 which force, when the frame moves, increases and decreases in relation to the surrounding water but substantially always has the same direction.

Figure 2:
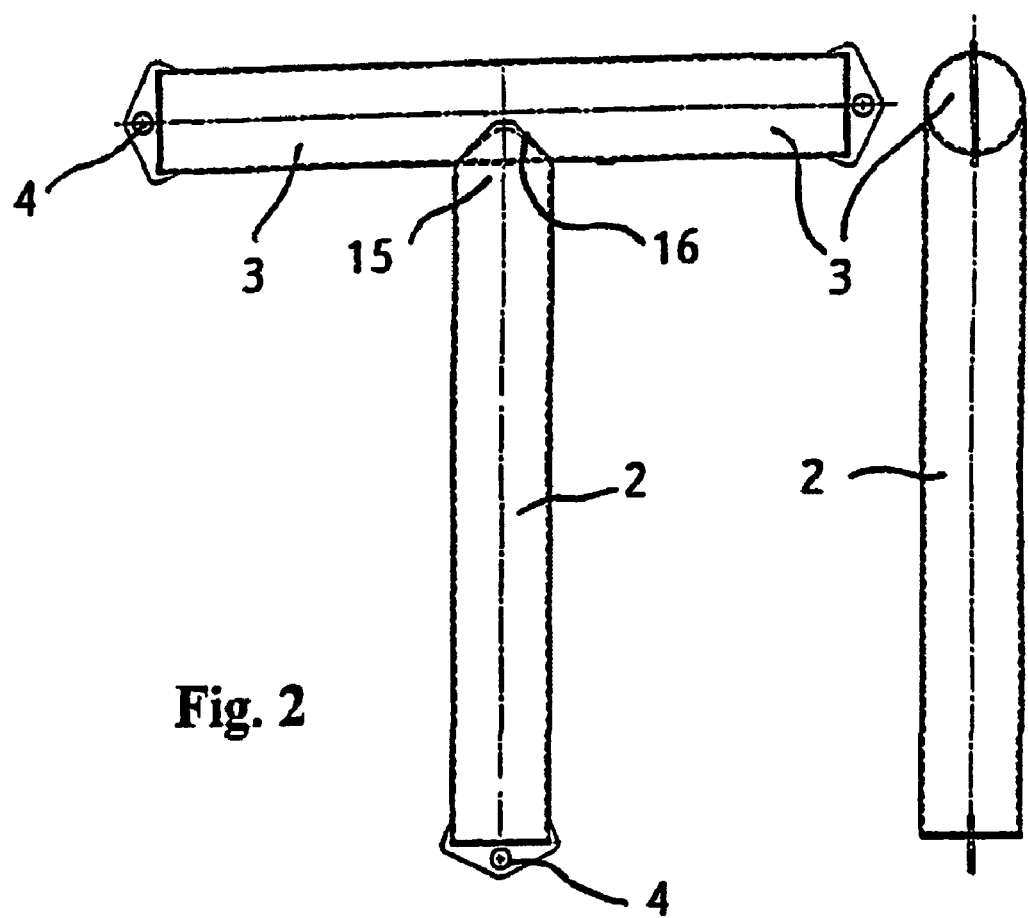
FIG. 2 is a top view and side view of a float of the paddlewheel aerator of FIG. 1.

FIG. 2 shows the two floats 2 and 3 of the frame 1 in a first embodiment where the float 2 has an eye 4 at one end only, however the float 3 at both ends, and the end 15 of the float 2 opposite to the eye end meets a central fitting groove 16 in the float 3 where the rigid connection between the two floats is made in a way that is not shown.

Figure 3:
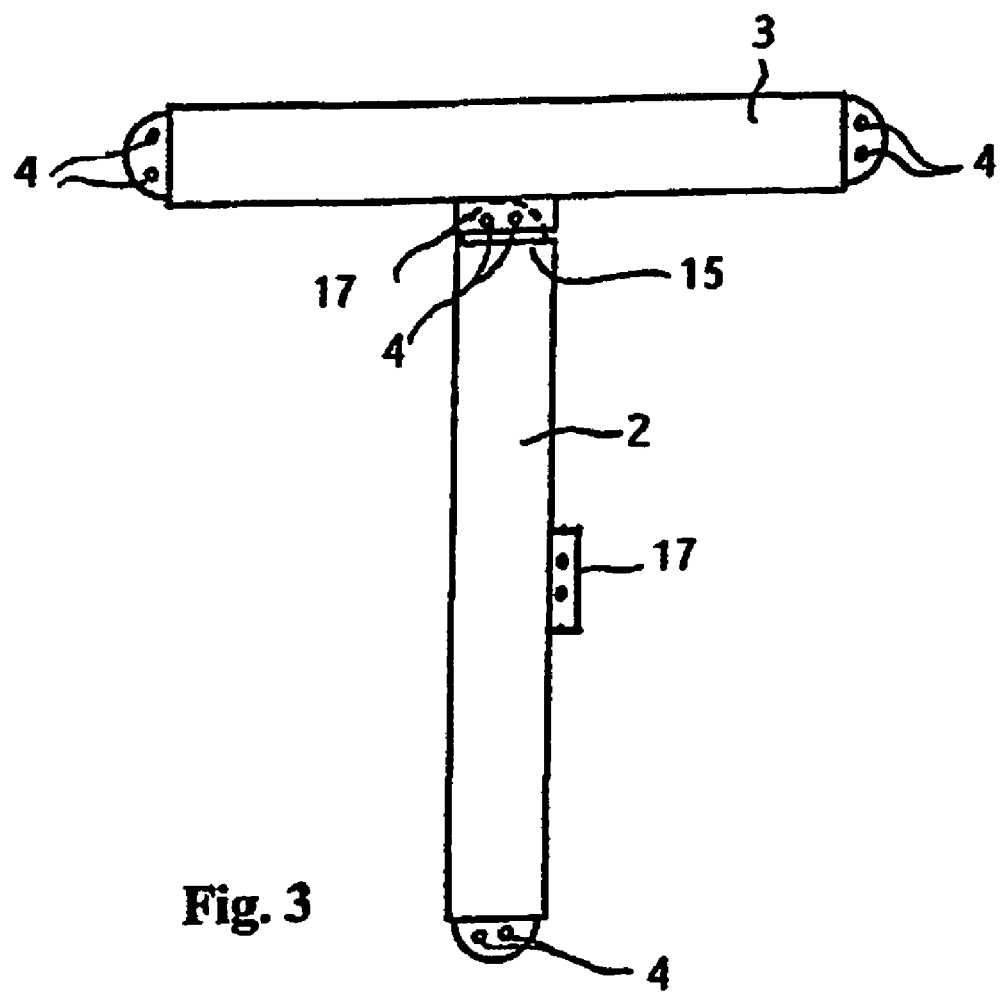
FIG. 3 is a top view of a variation of a float frame.

In contrast to this FIG. 3 shows a slightly different construction where the two floats 2 and 3 are identical and each of them in its central region has a fitting flange 17 which serves for coupling the end 15 of the float 2 to the central region of the float 3. The fitting flange 17 of the float 2 does not have any function for the assembled fame according to FIG. 3. However, according to a variation which is not shown, it can be used additionally for mounting the drive unit assembly 9 wherein corresponding coupling elements are provided on the drive unit assembly 9. Thereby this drive unit assembly is even better secured against an unwanted rotation on the float 2 when said float has a circular cross-section. For assembling the floats 2 and 3, the eyes 4 are used on the one hand and corresponding coupling elements of the fitting bracket 17 on the other hand in order to make a connection rotation-free in both directions between the two parts.

Figure 4:
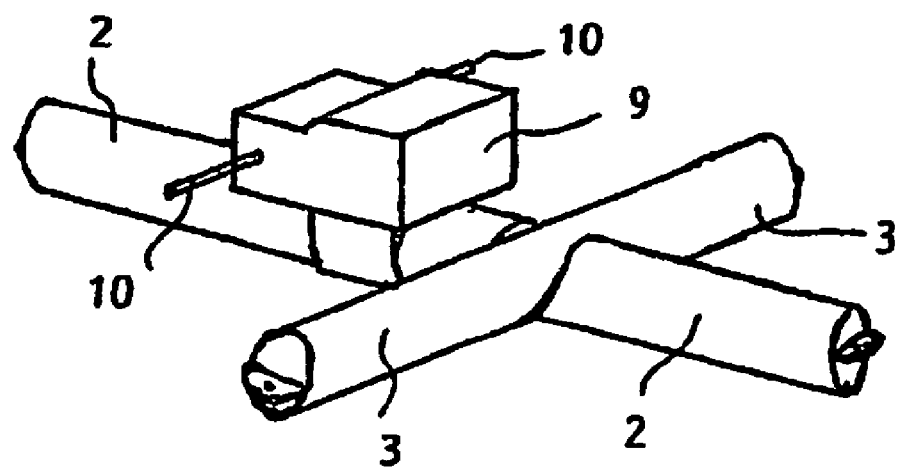
FIG. 4 is a perspective view of a variation of a float frame including a representation of the drive unit.

FIG. 4 shows a further alternative which may be advantageous in some situations, i.e. a cross configuration of the frame 1 where the floats 2 and 3 are connected to each other at points along their length. Such a design can be important if several paddlewheel aerators are to be combined in a certain way or if additional functional elements such as feeders for puting out forage are to be added.

Figure 5:
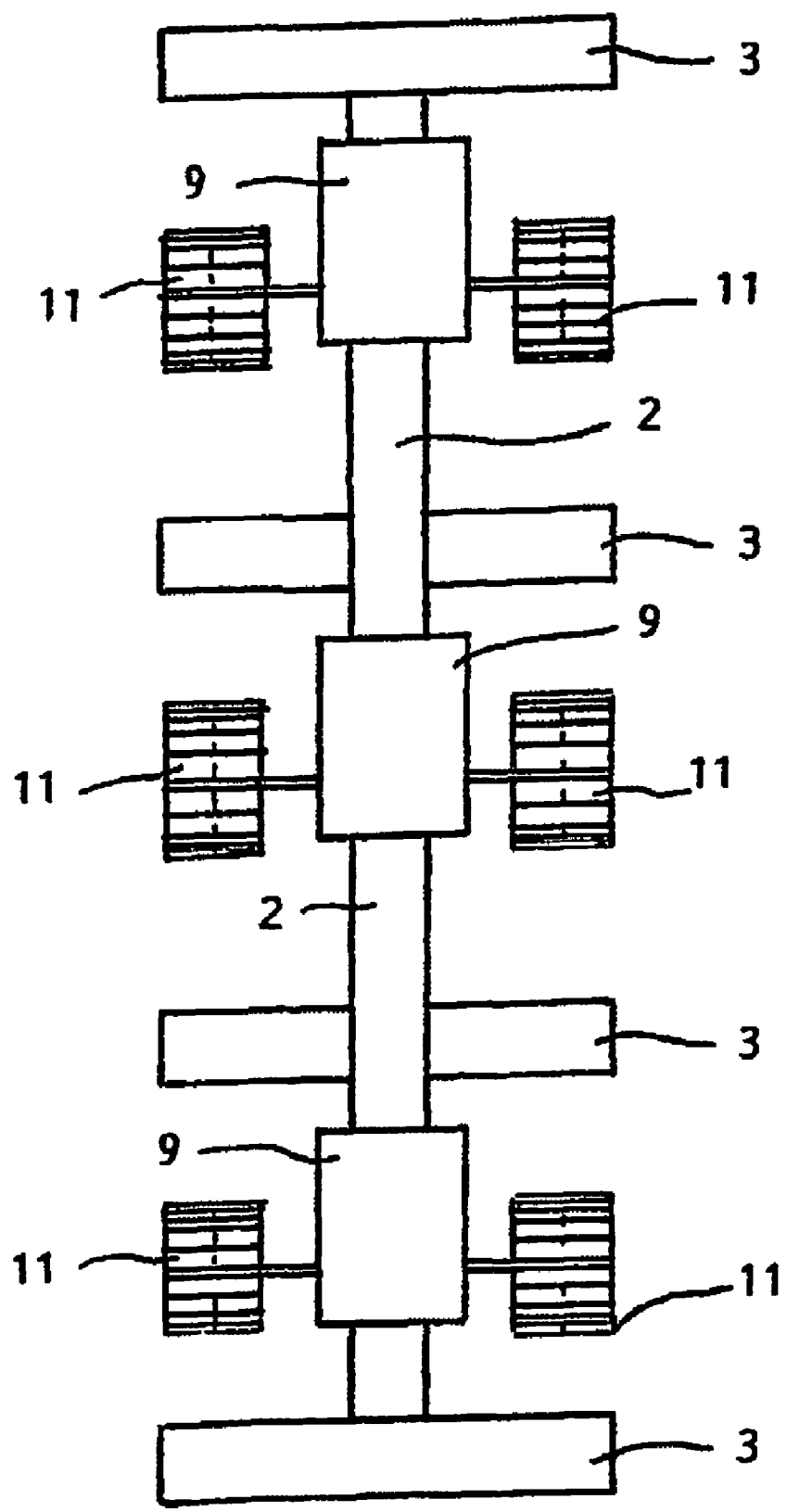
FIG. 5 is a schematic top view of a float with a further variation of the float frame.

An integrated combination of several paddlewheel aerators according to FIG. 1 is shown in FIG. 5 where the float 2 is very elongated and carries a total of three drive unit assemblies 9 with paddlewheels 11 while—in the example shown—at both ends the transverse floats 3 connect in a T coupling and between the assemblies 9 the floats 3 are connected in cross configuration as shown in FIG. 4.

Figure 6:
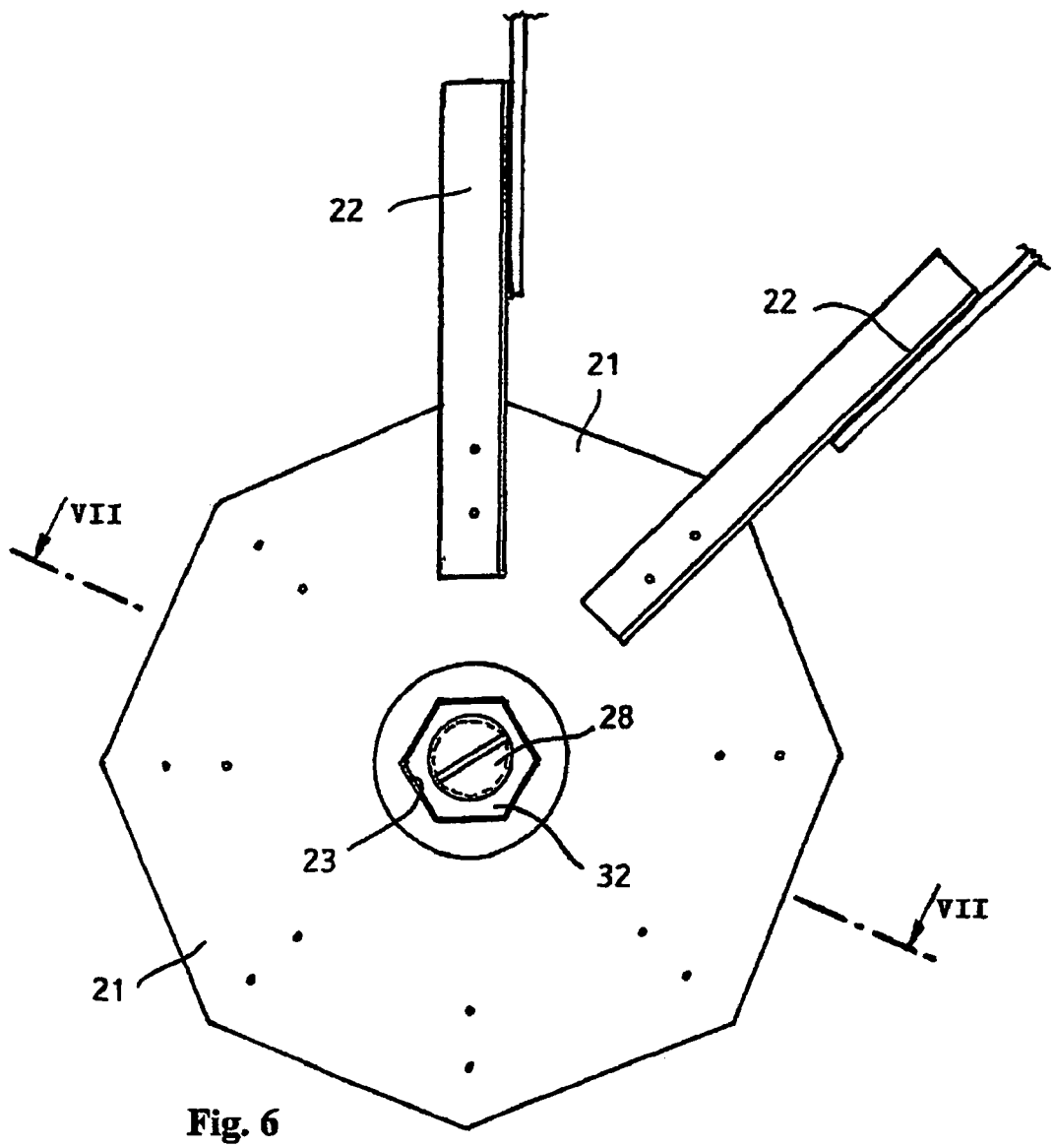
FIG. 6 is a representation for making dear the structure of the paddlewheels and the mounting thereof on their drive shaft.
Figure 7:
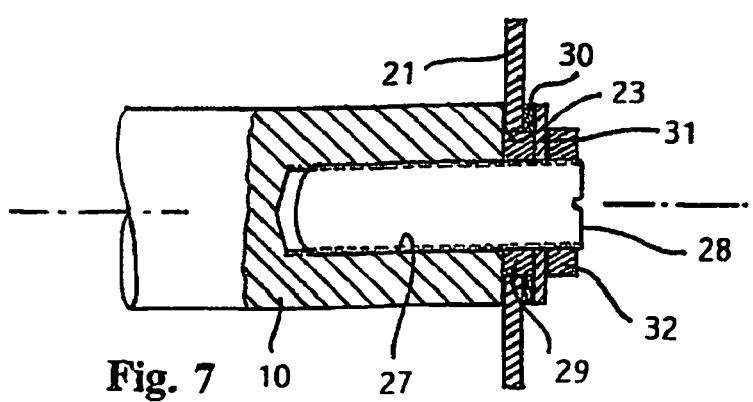
FIG. 7 is a cross-section of the shaft end portion and the paddlewheel of FIG. 6 in a plane VII—VII.

FIGS. 6 and 7 show a practical way of attaching the paddlewheels to the free ends of the shaft end portions 10. Each paddlewheel 11 consists of a support plate 21 and—in the examples shown—eight paddles 22 screwed onto the support plate, each comprising a stick screwed onto the support plate 21 and a perforated conventional paddle plate screwed onto this stick. In FIG. 6 only some of the paddles 22 are shown, however in reality they are distributed all over the circumference of the support plate 21. In its center the support plate exhibits a hexagonal recess 23.

In the end of the shaft end portion 10 there is a central axial thread bore 27, into which a threaded bolt 28 is driven nearly to the limit. The threaded bolt projects over the end face of the shaft end portion 10 and onto it a hexagonal nut 29 is screwed onto which the support plate 21 is stuck by its hexagonal recess 23. Onto the support plate 21 presses from the free end which is located on the right-hand side in FIG. 7 at first a ring 30 which is elastic to a certain degree and put around the nut 29 on the outside thereof and, then, a ring disc 31 which is stuck onto the threaded bolt 28 and serves as a limiting surface at the site of the face of the nut 29, and onto this ring 31 in turn presses a nut 32 which is screwed onto the bolt 28. The support plate 21 and the ring 30 are thus spanned between the end surface of the shaft end portion 10 and the outer ring area of the ring disc 31 wherein the elasticity of the ring 30 balances deviations within the tolerance range of the axial thickness of the nut 29.

The paddlewheels 11 have a operational rotational direction which is given by the construction and is necessary due to the design of the paddles 22. The resistance of the water against the operational rotation could, in accordance with the rotational direction, be suitable for exerting torque onto the nut 29 via the support plate 21, which in the case of a corresponding rotational direction loosens and unscrews it. The thread orientations are therefore chosen such that the threaded bolt 27 has a right-hand thread on the one side and a left-hand thread on the other side wherein the arrangement is such that the nut 29 is tightened by means of the brake torque which acts via the support plate 21.

As described above, within the framework of the invention there are numerous possibilities as regards the floats and float connections. For illustrating the vast scope of possibilities FIGS. 8 to 10 show some further examples.

FIG. 8 shows—like FIG. 1—tube-shaped floats, however in H configuration with a single float 2 and floats 3 attached to both ends. The drive unit, which is not shown, is basically mounted on the float 2 although parts of it can also rest on one or both of the floats 3. The advantage of the H configuration over the T configuration is the compact arrangement and the increased lifting force. However, a disadvantage is a certain torsion and thus torsional load on the float 2.

FIG. 9 shows—again on the basis of the T configuration—a variation in the float design. The float 3 consists of a bar piece 40 with low or no lifting force and lifting bodies 41 at both its ends. The float 2 in turn exhibits a bar piece 40, however the lifting body 41 is located at one end only while the other end is connected to the bar piece 40 of the float 3.

FIG. 10 shows a float with a rectangular cross-section which is produced by blow molding for example, in the form of hollow bodies 42 with one or two, respectively, increased-volume face-end additional lifting bodies 43. FIG. 10 also shows a variation of the connection between the floats 2 and 3, i.e. a dovetail connection 44 as an example. As has already been described above, there is a large number of constructional possibilities for the connection of which one or the other is to be preferred depending on the type of float. The dovetail connection 44 shown in FIG. 10, for example, is particularly suitable for the rectangular floats shown in FIG. 10 as well.

A further type of connection which is in particular suitable for round floats is shown in FIG. 14. At the end of the float 2 a flange 44 in the shape of a cylinder segment is arranged having two flat grooves 45 and whose cylinder segment interior radius is similar to the outer radius of the cylindrical float 3. The floats 2 and 3 are rigidly connected by means of clamp-like straps (not shown) to be put into the grooves 45, which straps are put around the float 3.

Figure 12:
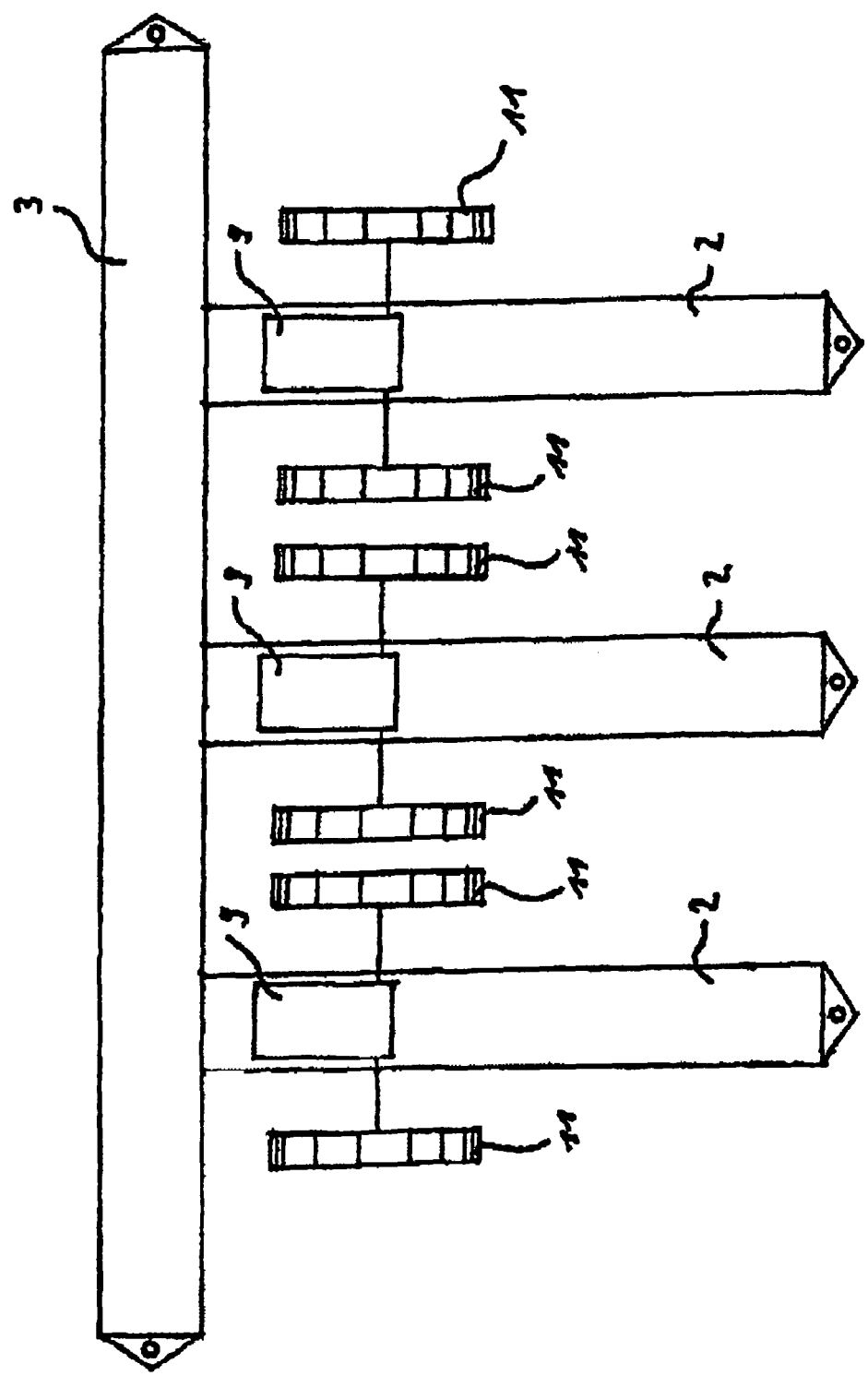
FIGS. 12 and 13 are top views of two further variations of inventive paddlewheel aerators.

The paddlewheel aerator shown in FIG. 12 has an elongated float 3 from which three longitudinal floats 2 project in transverse direction at regular intervals so that a threefold T arrangement is formed. At each longitudinal float there is a drive unit assembly 9 which each drives two paddlewheels 11.

Figure 13:
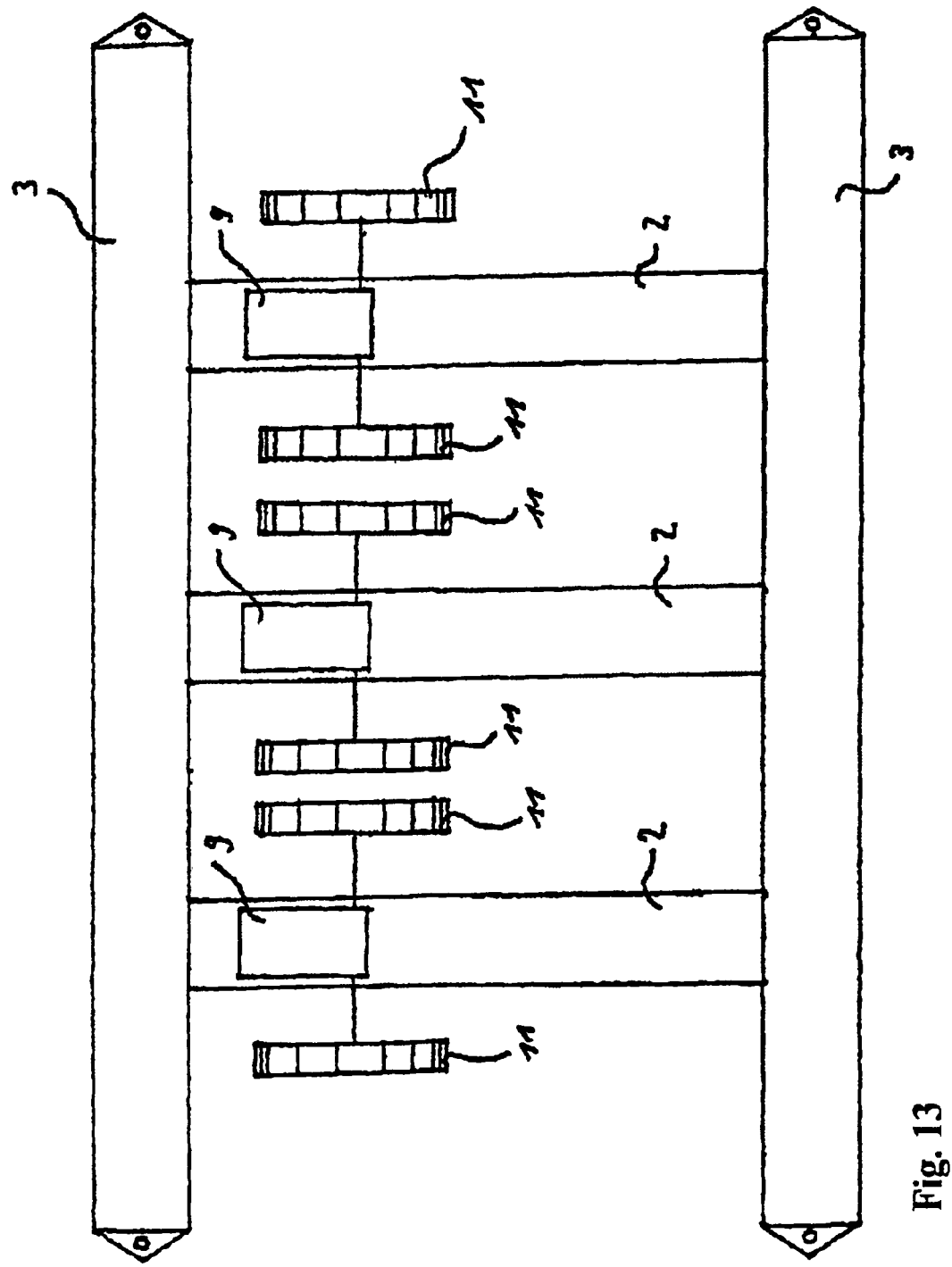

The paddlewheel aerator according to FIG. 13 differs from that of FIG. 12 in that the free ends present in FIG. 10 here are attached to a further elongated float 2, whose construction is identical to that of the first elongated float 2 (should read correctly: 3) so that a threefold H arrangement is formed.

What is claimed is:

1. Floating paddlewheel aerator for aerating water and clearing basins, comprising a frame (1) containing elongated floats (2, 3) and comprising at least one drive unit (9) supported by the frame with an output shaft (10) and paddles (22) mounted on this shaft, during operation of the aerator the floats floating on the surface of the water or clearing basin, the shaft rotating above the level of the water or clearing basin and parts of the paddles rotating with the shaft being immersed into the liquid, characterized in that the floats (2, 3) form the frame (1), are substantially arranged at a right-angle to each other and connected with each other in a configuration where at both opposite longitudinal sides of a first float (2) further floats (3) or float sections are mounted and that said first float (2) on its top side, which if compared with the longitudinal sides at which the further floats/float sections (3) are located, is turned upwards by 90°, partially or completely carries the drive unit (9) whose output shaft (10) projects on both sides and parallel to the longitudinal direction of the further floats/float sections (3) and is the shaft carrying the paddles (22).

2. Paddlewheel aerator according to claim 1, characterized in that the configuration of the floats (2, 3) is a T configuration.

3. Paddlewheel aerator according to claim 1, characterized in that the configuration of the floats (2, 3) is a cross configuration.

4. Paddlewheel aerator according to claim 1, characterized in that the configuration of the floats (2, 3) is an H configuration.

5. Paddlewheel aerator according to claim 1, characterized in that the floats (2, 3) are connected to each other by temporary joints.

6. Paddlewheel aerator according to claim 5, characterized in that the construction of the floats (2, 3) is identical.

7. Paddlewheel aerator according to claim 1, characterized in that drive unit (9) is located in a housing from which the output shaft (10) projects on both sides as a shaft end portion (10) which is supported at one end only.

8. Paddlewheel aerator according to claim 7, characterized in that the paddles (22) are mounted on support plates (21) each attached to one of the shaft end portions, stuck onto a non-circular connecting part (29) located at the shaft end and secured there against movement in the longitudinal direction of the shaft (10).

9. Paddlewheel aerator according to claim 8, characterized in that the non-circular connecting part is a nut (29) which is screwed onto a threaded bolt (28) filled into a threaded hole (27) in the shaft end, onto which a further nut (32) is screwed for securing the support plate (21).

10. Paddlewheel aerator according to claim 9, characterized in that the treaded holes (27), threaded bolts (28) and nuts (29) on both shaft end portions (10) have opposite thread directions which are chosen for tightening by the rotational resistance against the driving direction.

11. Paddlewheel aerator according to claim 2, characterized in that the floats (2, 3) are connected to each other by temporary joints.

12. Paddlewheel aerator according to claim 3, characterized in that the floats (2, 3) are connected to each other by temporary joints.

13. Paddlewheel aerator according to claim 4, characterized in that the floats (2, 3) are connected to each other by temporary joints.

14. Floating paddlewheel aerator for aerating water and clearing basins, comprising a frame (1) containing elongated floats (2, 3) and further comprising at least one drive unit (9) supported by said frame and having an output shaft (10) with paddles (22) mounted thereon wherein, during operation of the aerator, said floats float on the surface of the water or clearing basin, said shaft rotates above the level of the water or clearing basin and parts of said paddles rotate with said shaft being immersed into the liquid and wherein further said drive unit (9) is located in a housing from which said output shaft projects on both sides as a shaft end portion having a central axial thread bore into which a threaded bolt (28) is screwed leaving a portion of said threaded bolt (28) partially protruding from the end of each shaft end portion so that an hexagonal nut (29) may be screwed onto said threaded bolt (28) and wherein further said paddles (22) are mounted on said support plates (21) each of which includes an hexagonal recess (23) by means of which each said support plate is stuck onto one of the shaft end portions over said nut (29) and is secured there against movement in the longitudinal direction of said shaft (10) by means of a further nut (32) screwed onto said threaded bolt (28).

* * * * *